US011561778B1

(12) United States Patent
Tsang et al.

(10) Patent No.: US 11,561,778 B1
(45) Date of Patent: Jan. 24, 2023

(54) INSTRUMENTATION FOR NESTED CONDITIONAL CHECKS

(71) Applicant: International Business Machines Corporation, Armonk, NY (US)

(72) Inventors: Wai Hung Tsang, Markham (CA); Ettore Tiotto, Whitby (CA); Shimin Cui, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/533,475

(22) Filed: Nov. 23, 2021

(51) Int. Cl.
 *G06F 8/41* (2018.01)

(52) U.S. Cl.
 CPC .............. *G06F 8/4441* (2013.01); *G06F 8/43* (2013.01)

(58) Field of Classification Search
 CPC ................................. G06F 8/4441; G06F 8/43
 See application file for complete search history.

(56) References Cited

U.S. PATENT DOCUMENTS

| 7,243,339 | B2* | 7/2007 | Subrahmanyam .. | G06F 11/3466 |
| | | | | 717/130 |
| 8,806,463 | B1* | 8/2014 | Li ......................... | G06F 8/4443 |
| | | | | 717/154 |
| 9,507,576 | B2 | 11/2016 | Kawahito | |
| 9,612,809 | B2 | 4/2017 | Mahaffey et al. | |
| 2002/0095666 | A1 | 7/2002 | Tabata et al. | |
| 2003/0014741 | A1* | 1/2003 | Megiddo ............... | G06F 8/4441 |
| | | | | 717/158 |
| 2003/0097652 | A1* | 5/2003 | Roediger ................ | G06F 8/443 |
| | | | | 717/160 |
| 2004/0103401 | A1* | 5/2004 | Chilimbi ............ | G06F 11/3612 |
| | | | | 717/130 |
| 2005/0091645 | A1* | 4/2005 | Chilimbi ............... | G06F 11/366 |
| | | | | 717/130 |
| 2008/0177756 | A1* | 7/2008 | Kosche ............... | G06F 11/3476 |
| | | | (Continued) | |

FOREIGN PATENT DOCUMENTS

JP          3290567 B2 *  6/2002    .......... G06F 11/3466

OTHER PUBLICATIONS

Liu et al., "A Sample Profile-based Optimization Method with Better Precision" (Year: 2016).*

(Continued)

*Primary Examiner* — Phillip H Nguyen
(74) *Attorney, Agent, or Firm* — Cantor Colburn LLP; Peter Wang

(57) ABSTRACT

Aspects include executing a first phase that includes injecting instrumentation into program code in response to identifying an inner conditional check in the program code and running the instrumented program with a representative workload. The injecting includes duplicating the inner conditional check and placing a duplicate of the inner conditional check before a respective original nested conditional check in the program code to create an instrumented program. The instrumented program includes a plurality of basic blocks including original basic blocks and a newly added basic block that includes the duplicate of the inner conditional check. The method also includes executing a second phase that includes collecting execution frequency values from counters associated with the basic blocks to form metadata used to make optimization decisions for the program code.

20 Claims, 15 Drawing Sheets

(56) References Cited

U.S. PATENT DOCUMENTS

2012/0185830 A1* 7/2012 Baca .................. G06F 11/3636
717/128

OTHER PUBLICATIONS

Arnold et al., "A Framework for Reducing the Cost of Instrumented Code" (Year: 2001).*
Kim et al., "Design and Evaluation of Compiler Algorithms" (Year: 2002).*
Manilov et al., "Generalized Profile-Guided Iterator Recognition", Association for Computing Machinery, Published date: Feb. 2018, 11 pages.
Panchal et al., "Code Instrumentation using Dynamic Program Analysis Tools", International Journal of Engineering Research & Technology, vol. 3 Issue 4, Published date: Apr. 4, 2014, 8 pages.
Richard Gunther, "Profile driven loop transformations", GCC Developers—Summit 2006, Published date: Jun. 30, 2006, 10 pages.
Youenn Lebras, Code optimzation based on source to source transformations using profile guided metrics, HAL, Published date: Jul. 3, 2019, 161 pages.

* cited by examiner

```
102 ──  int foo() {
104 ──   if (A())   // A() is side-effect free
         if (B()) // B() is side-effect free
            return 0;
         return 1;
      }
```

FIG. 1

```
        int foo() {
206 ──    ++pgo_counter1;
102 ──    if (A()) {
202 ──      ++pgo_counter2;
104 ──      if (B()) {
204 ──        ++pgo_counter3;
            return 0;
          }
        }
        return 1;
        }
```

FIG. 2

```
int foo() {
 int x = 0;
 if (func1())
   if (func2()) {
     if (func3())
       x = 1;
     else
       x = 2;
   }
 if (func4())
   if (func5())
     x = 3;
 return x;
}
```

```
int foo() {
  ++pgo_counter1;
  int x = 0;
  if (func2'())
    ++pgo_counter2;
  if (func3'())
    ++pgo_counter3;
  if (func1()) {
    ++pgo_counter4;
    if (func2()) {
      ++pgo_counter5;
      if (func3()) {
        ++pgo_counter6;
        x = 1;
      } else
        x = 2;
    }
  }
  if (func4()) {
    ++pgo_counter7;
    if (func5()) {
      ++pgo_counter8;
      x = 3;
    }
  }
  return x;
}
```

FIG. 12

INSTRUMENTATION FOR NESTED CONDITIONAL CHECKS

BACKGROUND

The present invention generally relates to optimizing computer code, and more specifically, to improving profile-guided optimization (PGO) instrumentation for nested conditional checks.

Compilers can implement performance optimizations by using known heuristics to make guesses about code execution. For example, a compiler may predict the static frequency of a branch is taken based on where the branch is located, and/or it may choose to inline a function based on its size. To extract good performance out of a program, it is important for the programmer to have intrinsic knowledge of the compiler and system design, so that the programmer can provide hints or annotations to the compiler. Unfortunately, this is not always possible and another performance optimization technique that can be used is profile-guided optimization (PGO).

PGO is a method used by compilers to produce optimal code by using application runtime data. Because this data comes directly from the application, the compiler can make much more accurate guesses about code execution. PGO has two phases. During the first phase, the program being compiled is instrumented. When the program is run, using input data representative of the typical workload, the injected instrumentation collects characteristics of the program that are useful to the optimizer. During the second phase, the data collected in the first phase is used to reoptimize the program. The information collected is used to make better heuristic guided optimization decisions.

One technique used by PGO is to inject instrumentation designed to collect counters representing the execution frequency for the basic blocks in a function. Basic blocks with higher counters are executed more frequently than basic blocks with lower counters. Optimizations can use this information to augment the cost model used to decide whether a transformation of the code is deemed profitable.

SUMMARY

Embodiments of the present invention are directed to improving profile-guided instrumentation for nested conditional checks. A non-limiting example computer-implemented method includes executing a first phase that includes injecting instrumentation into program code in response to identifying an inner conditional check in the program code and running the instrumented program with a representative workload. The injecting includes duplicating the inner conditional check and placing a duplicate of the inner conditional check before a respective original nested conditional check in the program code to create an instrumented program. The instrumented program includes a plurality of basic blocks including original basic blocks and a newly added basic block that includes the duplicate of the inner conditional check. The method also includes executing a second phase that includes collecting execution frequency values from counters associated with the basic blocks to form metadata used to make optimization decisions for the program code.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 depicts an example of a conditional check nested inside another conditional check;

FIG. 2 depicts an example of a current instrumentation technique;

FIG. 6 is an example of source code containing nested conditional checks in accordance with one or more embodiments of the present invention;

FIG. 7, which includes

FIG. 12 depicts the source code of FIG. 6 after a PGO instrumentation generation pass;

Figure 3:
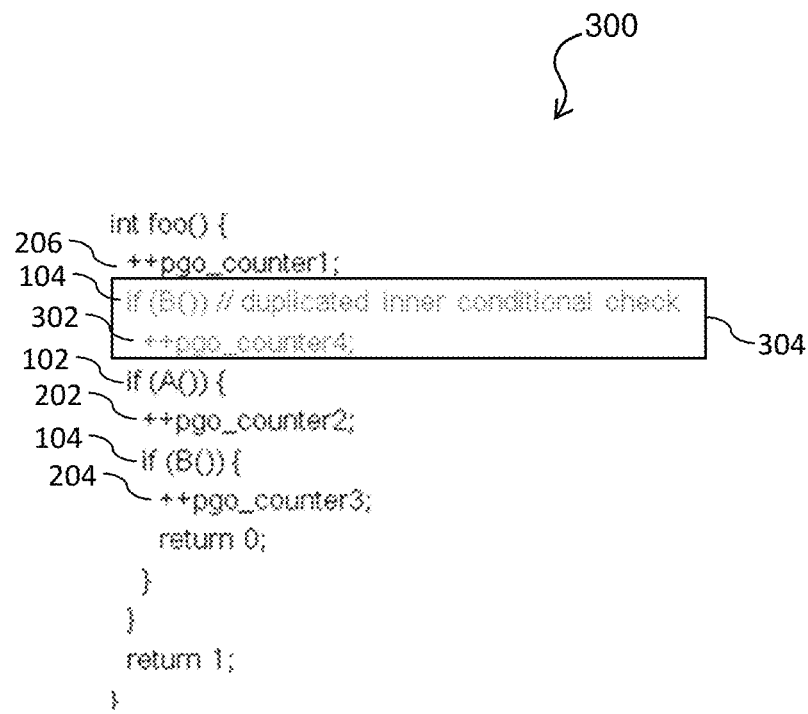
FIG. 3 depicts an example of an instrumentation technique in accordance with one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention provide a new instrumentation technique, in the context of profile-guided optimization (PGO), which can be used to obtain more precise profile information for a function in a computer program. One or more embodiments of the present invention utilize the obtained profile information to provide improved PGO instrumentation for nested conditional checks in the computer program. The additional information obtained from the improved PGO instrumentation is utilized to perform heuristic guided optimization decisions that can include reordering a nested conditional check in a manner that can save runtime.

Turning now to FIG. 1, an example of source code 100 containing a conditional check nested inside another conditional check is generally shown. The example shown in FIG. 1 executes a function called "foo" and contains two conditional checks a first conditional check 102 "if (A( ))" and a second conditional check 104 "if (B( ))" nested within the first conditional check 102. The second conditional check 104 can be referred to as an "inner conditional check" because it is nested within the first conditional check 102. The source code 100 shown in FIG. 1 is a simplified example that is utilized herein to illustrate one or more embodiments of the improved PGO instrumentation for nested conditional checks. One skilled in the art will appreciate that one or more embodiments of the present invention described herein can be extended to more complex controls flow containing large numbers of nested conditional checks.

Turning now to FIG. 2, an example of instrumented source code 200 is generally shown. In the example shown in FIG. 2, the source code 100 of FIG. 1 is instrumented using contemporary instrumentation techniques, resulting in instrumented source code 200. As shown in FIG. 2, each basic block in the source code 100 of FIG. 1 has an associated PGO counter and each counter is incremented every time that its associated basic block is executed at runtime. The first counter 206 "pgo_counter1" represents the number of times function "foo" is entered, the second counter 202 "pgo_counter2" represents the number of times function A evaluates to true, and the third counter 204 "pgo_counter3" represents the number of times both function A and function B evaluate to true. It is known that the third counter 204 "pgo_counter3" will contain a value that is equal to or smaller than the value of the second counter 202 "pgo_counter2" because the basic block associated with the third counter 204 is executed only when both conditions are true, while the basic block associated with the second counter 202 is executed when just one condition, (A( )), evaluates to true.

This information which is provided by contemporary PGO techniques, such as that shown in FIG. 2, is not sufficient to infer how many times function B( ) evaluates to true when A( ) evaluates to false. If the compiler knew how many times the function B( ) is predicted to evaluate to true, its optimizer could reorder the conditional checks from least frequently true to most frequently true to reduce the function execution time. One or more embodiments of the present invention overcome this deficiency in contemporary approaches by providing an improved PGO instrumentation technique that duplicates, or clones, an inner conditional check and places it before the original nested conditional checks as shown in FIG. 3 below.

Turning now to FIG. 3, an example of an instrumented source code 300 is generally shown in accordance with one or more embodiments of the present invention. As shown in FIG. 3, additional source code 304, a duplicate of the inner conditional check, the second condition check 104 "if (B( ))", is inserted into the instrumented source code 200 of FIG. 2. The additional source code 304 includes the second conditional check 104 "if (B( ))" and a fourth counter 302 "pgo_counter4." The value of the fourth counter 302 can be interpreted as the number of times that function B( ) evaluates to true independently of the evaluation of function A( ). At first glance, it may seem counter intuitive to add another conditional check and an additional counter because duplicating the inner conditional check(s) increases the execution time. This is not the case however, as PGO instrumentation is injected by a compiler in a first phase (the instrumentation phase) and therefore will not affect the execution time of the final optimized program output by the compiler in a second phase which generates the optimized executable code.

The extra profile information, or metadata, that is collected by one or more embodiments of the present invention supports additional optimization decisions in the recompilation phase as described herein, ultimately yielding better runtime performance for the optimized program. An example of an additional optimization based on the additional information provided by one or more embodiments of the present invention is shown in FIG. 4.

Figure 4:
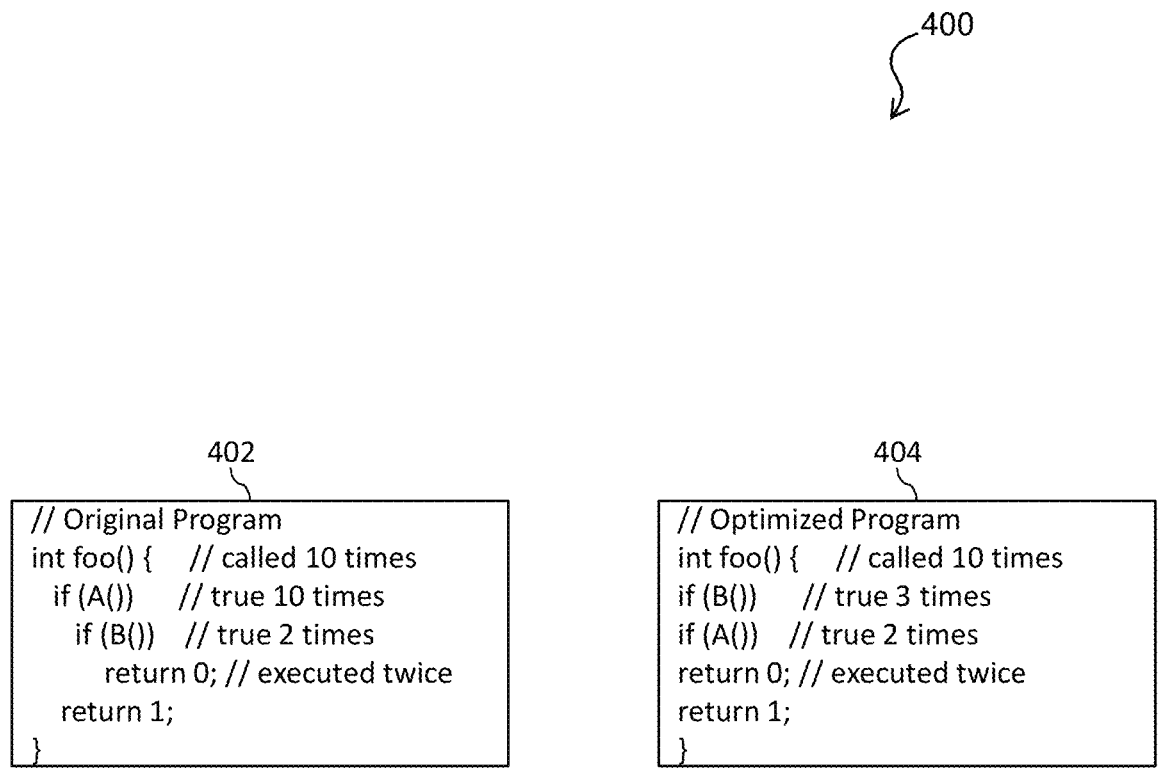
FIG. 4 depicts an example of program code with two-level nested conditional checks interchanged in accordance with one or more embodiments of the present invention.

Turning now to FIG. 4, an example of original program code 402 and optimized program code 404 are generally shown in accordance with one or more embodiments of the present invention. The examples in FIG. 4 show two-level nested conditional checks that are interchanged in accordance with one or more embodiments of the present invention based on data collected, for example, from the counters in the instrumented source code 300 of FIG. 3.

In the example shown in FIG. 4 it is assumed that function B( ) evaluates to false more frequently than function A( ) evaluates to false, and that both functions have no side effects (e.g., they don't modify a global variable, etc.). Interchanging the two conditional checks as shown in FIG. 4 results in a reduction in the number of times that function A( ) is called. For example, based on the instrumentation it can be determined that the function "foo" is executed ten times, function A( ) evaluates to false zero out of ten times, and function B( ) evaluates to false seven out of ten times. The cost of executing the original program code 402 is calculated as ten times the cost to execute function (A)+ten times the cost to execute function (B) (10 A_cost+10 B_cost). The cost of executing the optimized program code 404 is calculated as ten times the cost to execute function (B)+three times the cost to execute function (A) (10 B_cost+3 A_cost). The above savings assumes that the complexity of function A( ) and function B( ) are roughly equivalent. The complexity of the functions can be estimated using any techniques known the art.

The examples described herein refer to results of functions. One skilled in the art will appreciate that one or more embodiments described herein can also apply to conditions that can be evaluated (e.g., A+B).

Figure 5:
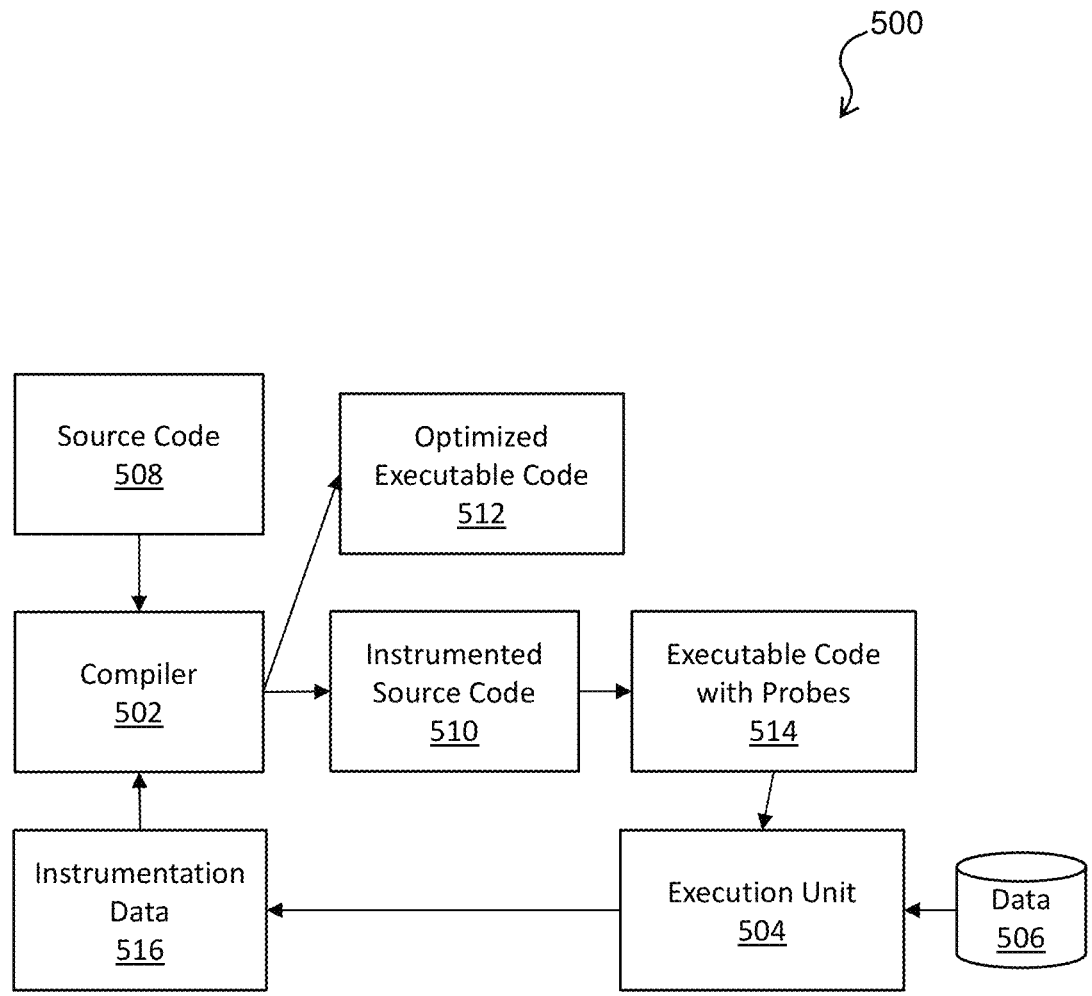
FIG. 5 depicts a block diagram of components of a system for profile-guided optimization (PGO) instrumentation for nested conditional checks in accordance with one or more embodiments of the present invention.

Turning now to FIG. 5, a block diagram of components of a system 500 for PGO instrumentation for nested conditional checks is generally shown in accordance with one or more embodiments of the present invention. All or a subset of the processing described in reference to FIG. 5 can be performed by all or a subset of system 1400 of FIG. 14. The system 500 shown in FIG. 5 includes a compiler 502, an execution unit 504, and data storage 506.

The compiler 502 can be implemented by any compiler known in the art that can be augmented with or modified to include the improved PGO instrumentation described herein. In accordance with one or more embodiments of the present invention, the compiler is implemented by all or a portion of the system 1400 shown in FIG. 14. Examples of compilers 502 that can be utilized include, but are not limited to: IBM XL compilers, LLVM, and GCC. As shown in FIG. 5, during a first pass, or instrumentation phase, the compiler 502 receives source code 508 and it adds counters, or other probes to the source code 508 to generate instrumented source code 510. Source code 100 of FIG. 1 is an example of source code 508, and instrumented source code 200 is an example of instrumented source code 510. During the first pass the compiler 502 generates executable code with probes 514 to be executed by execution unit 504.

The execution unit 504 can be implemented by any processor known in the art that can execute computer code. The execution unit 504 executes the executable code with probes 514 using input data from the data storage 506 to generate instrumentation data 516 (also referred to herein as "metadata"). In accordance with one or more embodiments of the present invention, the input data from the data storage 506 is representative of a typical workload executed by the source code. The execution unit 504 outputs instrumentation data 516 (e.g., counter values, etc.) in addition to other data outputs (not shown) typically produced by the source code.

During a second pass, or optimization phase, the compiler 502 generates optimized executable code 512 based on the source code 508 and the instrumentation data 516. Optimized program code 404 is an example of optimized executable code 512.

Data storage 506 can be implemented by any one or more storage mechanisms known in the art such as, but not limited to, one or more of a database, a storage device, and/or a file system. Data storage 506 can store data that is used as input to the code when it is being executed. In addition, data storage 506 can store all or a subset of data that is output by the code when it is executed, instrumentation data 516, instrumented source code 510, source code 508, optimized executable code 512, and executable code with probes 514.

It is to be understood that the block diagram of FIG. 5 is not intended to indicate that the system 500 is to include all of the components shown in FIG. 5. Rather, the system 500 can include any appropriate fewer or additional components not illustrated in FIG. 5 (e.g., additional compilers/execution units, inputs, outputs, etc.). In addition, one or more of the components shown in FIG. 5 can be combined together or separated into two or more components. The components can be connected directly or via one or more networks. Further, the embodiments described herein with respect to system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Turning now to FIG. 6, an example of source code 600 containing nested conditional checks is generally shown in accordance with one or more embodiments of the present invention. Source code 600 shown in FIG. 6 is utilized herein to illustrate one or more embodiments of the improved PGO instrumentation for nested conditional checks. Source code 600 is an example of source code 508 of FIG. 5.

Figure 7A:
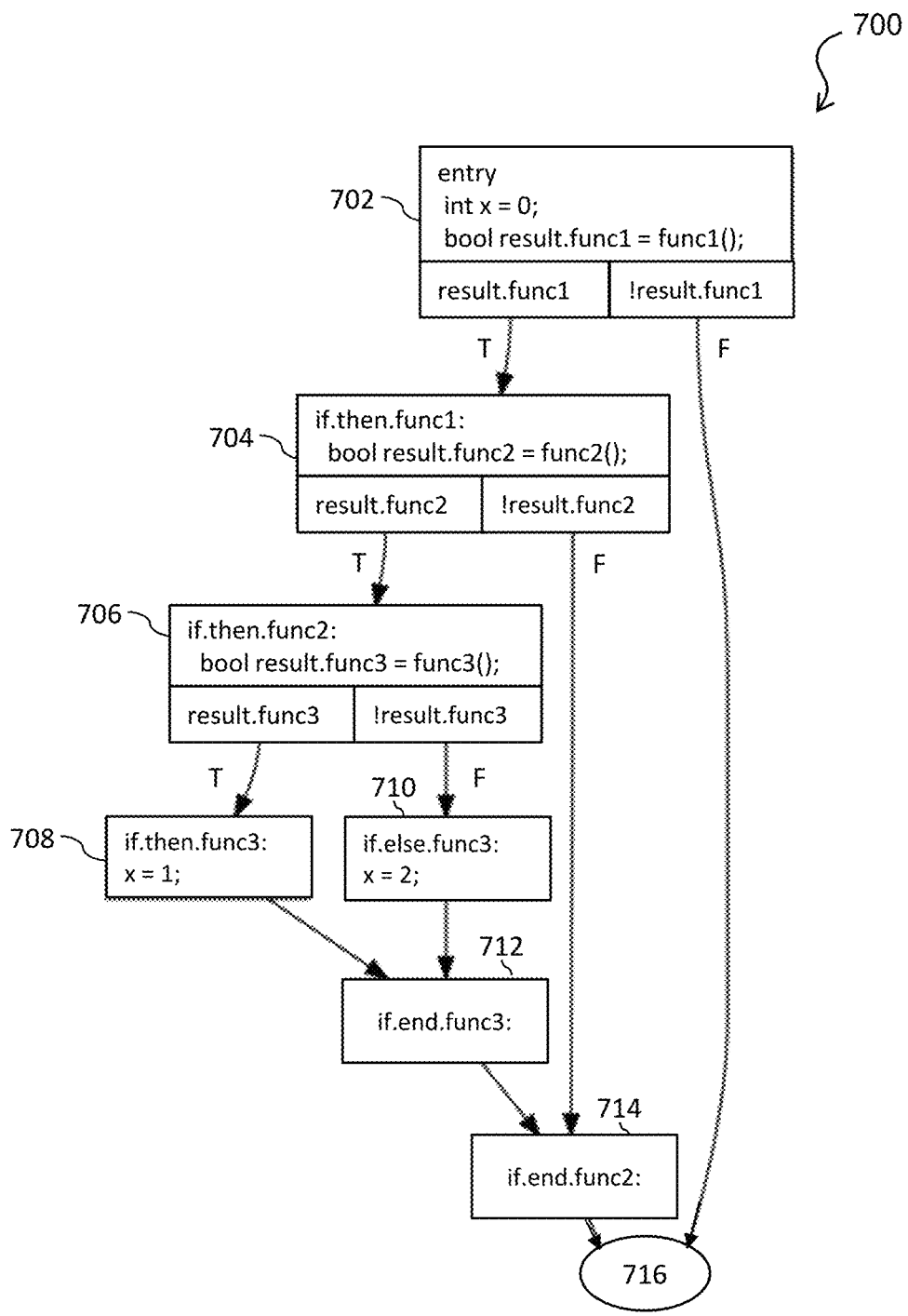
FIGS. 7A and 7B, depicts a control flow graph of the source code of FIG. 6 in accordance with one or more embodiments of the present invention.
Figure 7B:
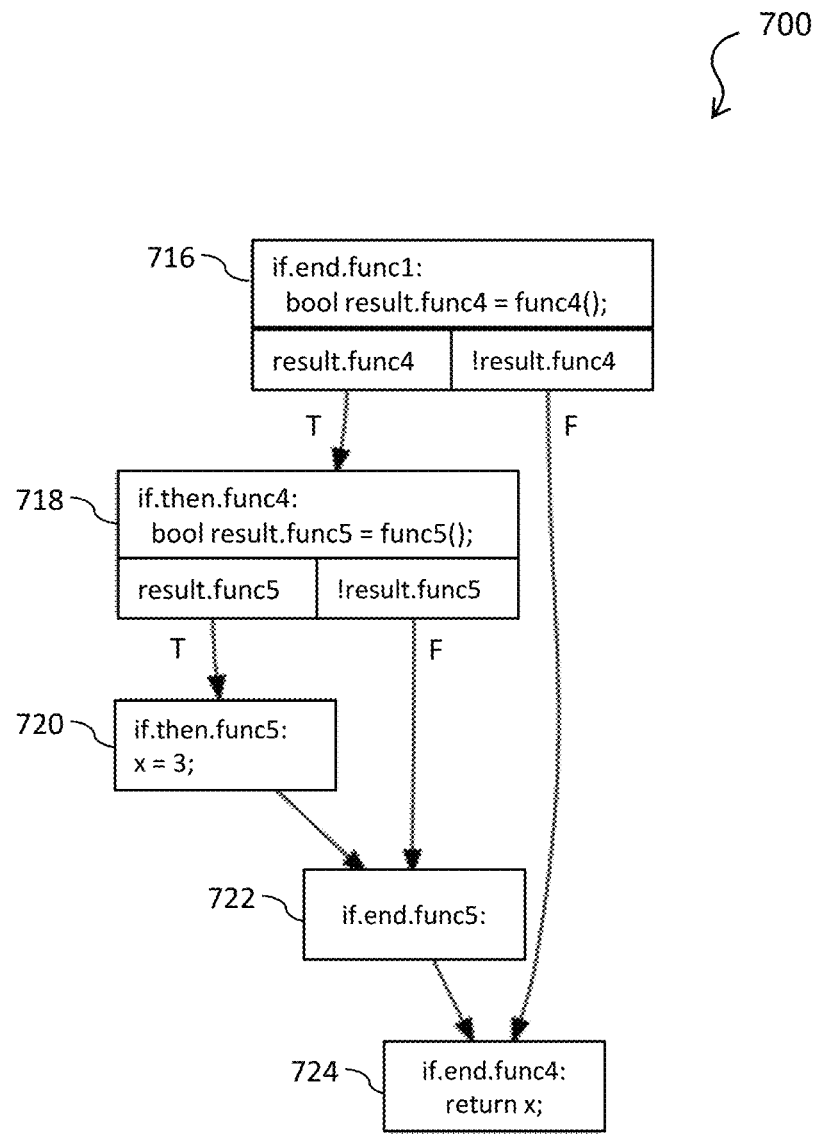

Turning now to FIG. 7, which includes FIGS. 7A and 7B, a control flow graph 700 of the source code 600 of FIG. 6 is generally shown in accordance with one or more embodiments of the present invention. The control flow graph 700 is a representation, using graph notation, of all paths that might be traversed through basic blocks in a program during its execution. Each of the blocks in FIG. 7 is a basic block (e.g., "if.then.func1" represents the basic block when "func1( )" is evaluate to true). The control flow graph 700 shown in FIG. 7 can be generated, by a compiler such as compiler 502 of FIG. 5, from the source code 600 of FIG. 6 using any methods known in the art.

The control flow graph 700 in FIG. 7A includes a first block 702 that enters the function "foo", initializes a value of the variable "x" to zero, evaluates a result from "func1", branches to block 716 if "func1" evaluates to false, and branches to block 704 if "func1" evaluates to true. Block 704 evaluates a result returned from "func2", branches to block 706 if "func2" evaluates to true, and branches to block 714 if "func2" evaluates to false. Block 714 represents the end of the if/then/else processing, or portion of the nested conditional check, that depends on the Boolean value returned by "func2". Block 706 evaluates a result from "func3", branches to block 708 if "func3" evaluates to true, and branches to block 710 if "funct3" evaluates to false. At block 708, the value of the variable x is set to one and the flow branches to block 712. At block 710, the value of the variable x is set to two and the flow branches to block 712. Block 712 represents the end of the if/then/else processing, or portion of the nested conditional check, that depends on the Boolean value returned by "func3".

As shown in FIG. 7B, block 716 ends the portion of the nested conditional check that depends on the value returned by "func1", evaluates a result from "func4", branches to block 724 if "func4" evaluates to false, and branches to block 718 if "func4" evaluates to true. Block 718 evaluates a result from "func5", branches to block 720 if "func5" evaluates to true, and branches to block 722 if "func5" evaluates to false. At block 720, the value of the variable x is set to three and the flow continues at block 722. Block 722 represents the end of the if/then processing, or portion of the nested conditional check, that depends on the Boolean value returned by "func5". The flow continues at block 724 where the portion of the nested conditional check that depends on the value returned by "func4" is ended and the value of the variable x is returned.

Figure 8:
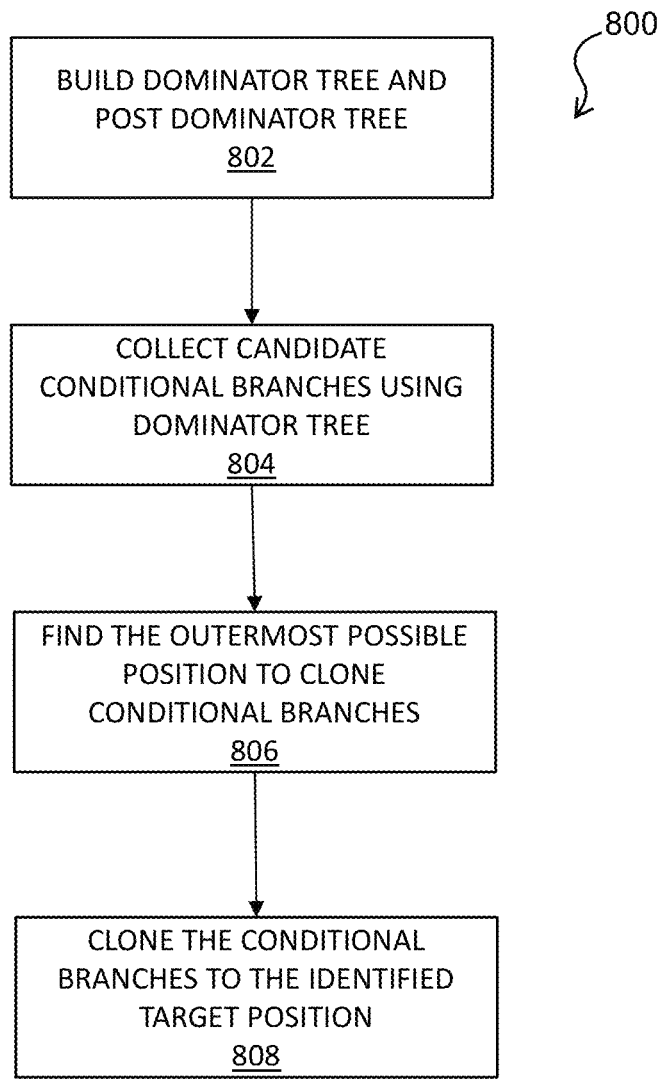
FIG. 8 depicts process flow of a method for PGO instrumentation for nested conditional checks in accordance with one or more embodiments of the present invention.
Figure 9:
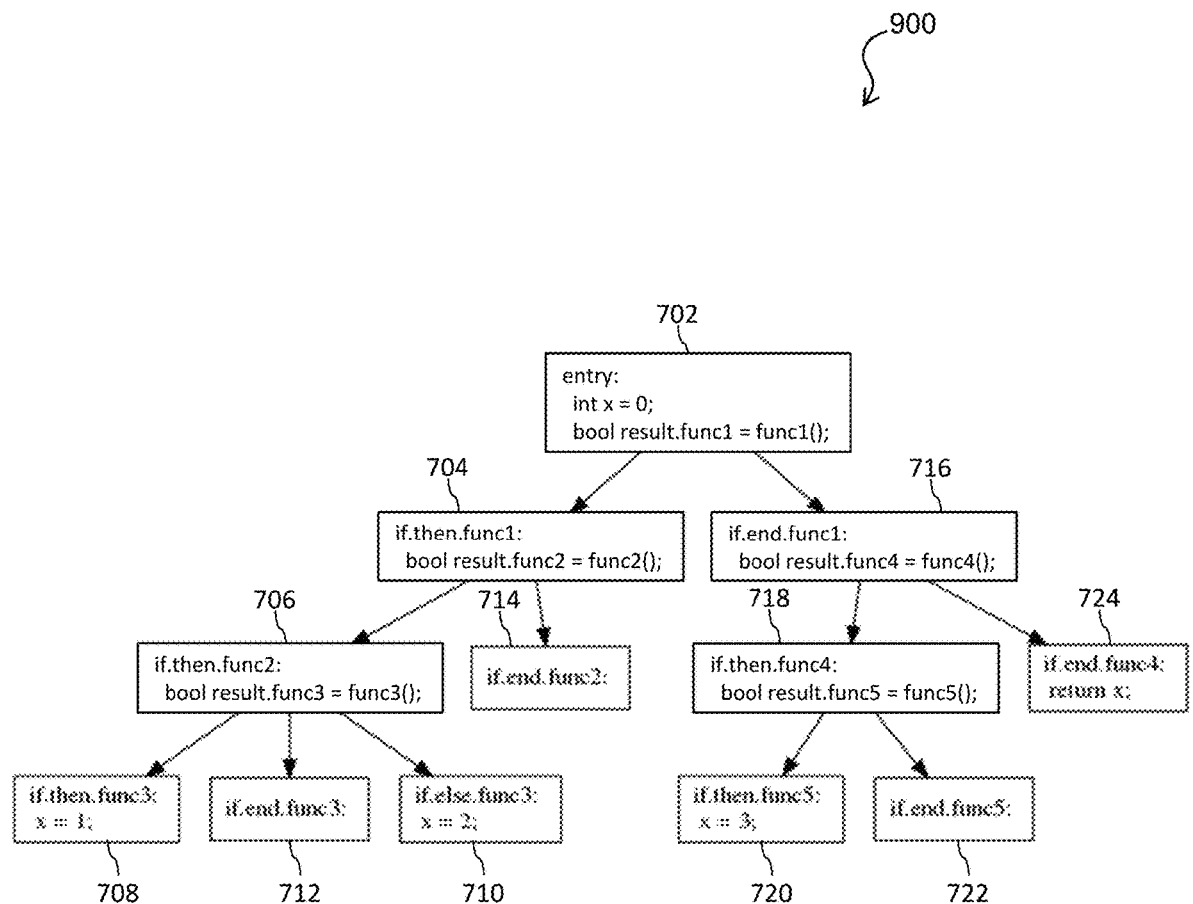
FIG. 9 depicts a dominator tree of the source code of FIG. 6 in accordance with one or more embodiments of the present invention.
Figure 10:
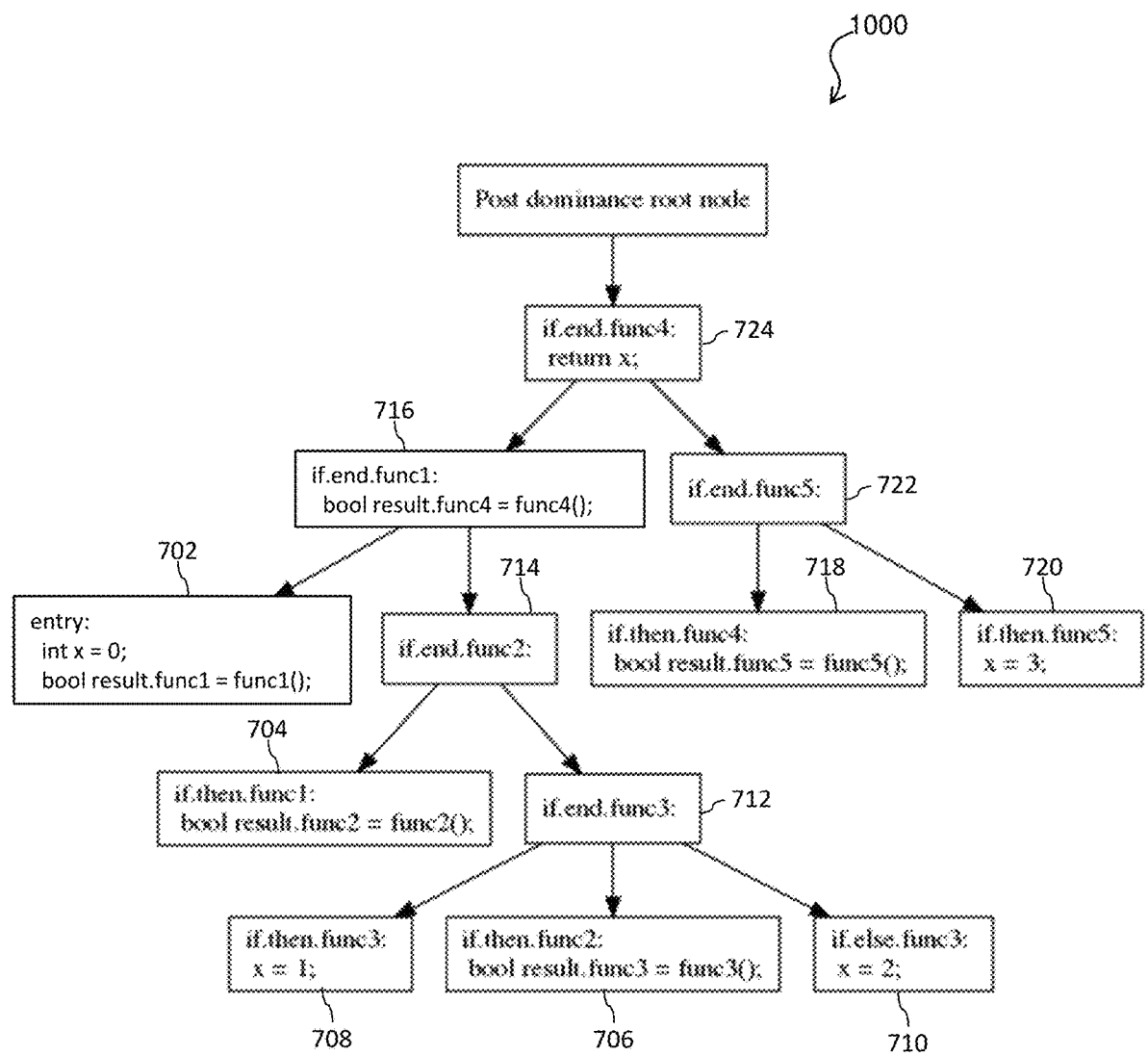
FIG. 10 depicts a post dominator tree of the source code of FIG. 6 in accordance with one or more embodiments of the present invention.

Turning now to FIG. 8, a process flow of a method 800 for PGO instrumentation for nested conditional checks is generally shown in accordance with one or more embodiments of the present invention. The method 800 shown in FIG. 8 can be performed, for example, by compiler 502 of FIG. 5. At block 802 a dominator tree and a post dominator tree are built for the source code being optimized. FIG. 9 depicts an example of a dominator tree 900 corresponding to the source code of FIG. 6 (and thus, the control flow diagram of FIG. 7) in accordance with one or more embodiments of the present invention. As known in the art, a dominator tree is a tree where each node's children are those nodes it immediately dominates. FIG. 10 depicts an example of a post dominator tree 1000 corresponding to the source code of FIG. 6 (and thus, the control flow diagram of FIG. 7) in accordance with one or more embodiments of the present invention. As known in the art, the initial node, or block 724 in a post dominator tree is the exit node of the control flow graph and each node's parent is its immediate post dominator. The dominator tree 900 shown in FIG. 9 and the post dominator tree 1000 shown in FIG. 10 can be built using any method known in the art.

At block 804 of FIG. 8, candidate conditional branches are collected using the dominator tree. In accordance with one or more embodiments of the present invention, the dominator tree is traversed in a breadth-first fashion to populate a candidate set with nodes, or blocks, that have more than one child. In the dominator tree 900 shown in FIG. 9, the basic blocks that satisfy this requirement are bock 702, block 704, block 716, block 706, and block 718. The candidate conditional branch set (or "candidate set") is then pruned by removing basic blocks that are terminated by instructions which depend on instructions that might have a side effect. Examples of instructions that may have potential side effects side effects include, but are not limited to instructions that modify global or static variables, write to a database, or a file, or a console. If an instruction has potential side effects, then it is not safe to speculatively execute.

In the example described herein in reference to the source code 600 of FIG. 6, assuming "func1", "funct2", "func3", and "func4" do not have side effects and "func5" may have side effects. In response to this, block 718 "if.then.func4" is removed from the candidate set. This results in a candidate set={block 702 "entry", block 704 "if.then.func1", block 716 "if.end.func1", and block 706 "if.then.func2"}.

At block 806 of FIG. 8, the outermost possible position to clone, or duplicate, conditional branches is determined. In accordance with one or more embodiments of the present invention, this is performed by, for each node in the candidate set, traversing its ancestor nodes (in the same set) in top-down order. If the ancestor node is control flow equivalent to the current node, then another ancestor node is considered. Basic block A and B are control flow equivalent if and only if A dominates B and B post dominates A. Otherwise, the terminating instruction in the current node is analyzed. If the terminating instruction is safe to clone before the terminating instruction of the ancestor node, then an entry specifying this is added to a clone position map. For example, an entry such as {currentNode→ancestorNode} is added to the clone position map.

Both the dominator tree and the post dominator tree can be used to determine if two basic blocks are control flow equivalent. Referring to the example source code of FIG. 6, to dominator tree 900 of FIG. 9 and to post dominator tree 1000 of FIG. 10, let candidate set={block 702 "entry", block 704 "if.then.func1", block 716 "if.end.func1", and block 706 "if.then.func2"} be the set of candidate basic blocks derived from block 804 of FIG. 8. The processing performed at block 806, applied to this running example yields:

Let block 702 "entry" be the candidate node selected from that set. Because block 702 "entry" has no ancestor nodes in the candidate set, it is discarded.

Let block 704 "if.then.func1" be the next candidate node selected, its ancestor node is block 702 "entry." Block 702 "entry" is not control flow equivalent to block 704 "if.then.func1." Furthermore, the terminator instruction in block 704 "if.then.func1" is safe to be clone before the terminating instruction of block 702 "entry", and therefore an entry {block 704 "if.then.func1"→block 702 "entry"} is created in the clone position map.

Let block 716 "if.end.func1" be the next candidate node selected, its ancestor node is block 702 "entry." Block 702 "entry" is control flow equivalent to block 716 "if.end.func1", therefore it is skipped.

Let block 706 "if.then.func2" be the next candidate node selected. It has two ancestor nodes block 702 "entry" and block 704 "if.then.func1." Block 702 "entry" is not control flow equivalent to block 704 "if.then.func1." Furthermore, the terminator instruction in block 706 "if.then.func2" is safe to be cloned before the terminating instruction of block 702 "entry." Therefore, an entry {block 706 "if.then.func2"→block 702 "entry"} is added in the clone position map.

In this example, the clone position map contains {{block 704 "if.then.func1"→block 702 "entry"}, {block 706 "if.then.func2"→block 702 "entry"}}

At block 808 of FIG. 8, the conditional branches are cloned to the target positions identified in the clone position map. The following is performed for each entry in the clone position map:

Clone the terminating instruction in the basic block identified by the map 'key', along with any instruction(s) it depends on and inject the cloned instruction before the terminator of the basic block identified by the map value.

Split the resulting basic block just before the original terminator. Let the original basic block be called BB1 and the new basic block be called BB2.

Insert a new basic block named BB3 so that its only successor is BB2, and modify the conditional branch terminating BB1 so that its successors are BB3 (true branch) and BB2 (false branch).

Figure 11:
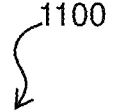
FIG. 11 depicts a transformed source code of FIG. 6 in accordance with one or more embodiments of the present invention.

In accordance with one or more embodiments of the present invention, during the cloning of block 808, if the terminating instruction depends on a call instruction, then the callee is cloned, and the cloned call instruction is changed so that the new callee is invoked. This avoids incrementing the PGO counters of the original callee incorrectly. FIG. 11 depicts an example of the transformed source code 1100 for the running example described herein where the terminating instruction in block 704 "if.then.func1" is "br i1% result.func2, label % if.then.func2, label % if.end.func2" and the terminating instruction in block 706 "if.then.func2" is "br i1% result.func3, label % if.then.func3, label % if.end.func3"). The terminator of block 702 "entry" is "br i1% result.func1, label % if.then.func1, % if.end.func1".

Turning now FIG. 11, transformed source code 1100 corresponding to the source code 600 of FIG. 6 is generally shown in accordance with one or more embodiments of the present invention. As shown in FIG. 11, the transformed source code 1100 includes two additional instructions 1102, that are added to the source code 600 of FIG. 6, that represent the terminating instructions, along with any instruction(s) it depends on, in blocks 704 and 706. The duplicate additional instructions 1102 are inserted prior to the terminator of block 720.

In accordance with one or more embodiments of the present invention, the new transformed source code 1100 is generated before the PGO instrumentation generation pass. Existing mechanisms to insert PGO instrumentation counters can insert the new counters for the newly created basic blocks based on the transformed source code generated by one or more embodiments of the present invention without requiring modifications to the existing PGO mechanisms.

Source code can be broken down into a plurality block, or basic blocks. As used herein, the term "original basic block" refers to an instruction(s) in the original source code such as an instruction(s) in in the source code 600 of FIG. 6. In accordance with one or more embodiments of the present invention, the original basic blocks of the source code 600 code in FIG. 6 are illustrated in the control flow graph 700 of FIG. 7, with each block in FIG. 7 representing an original basic block. As used herein the term "newly added basic block" refers to an instruction that is added by the instrumentation phase. Each of the additional instructions 1102 shown in FIG. 11 can be referred to as a newly added basic block.

Turning now to FIG. 12, the transformed source code 1100 of FIG. 11 after a PGO instrumentation generation pass is generally shown in accordance with one or more embodiments of the present invention. The instrumented code 1200 shown in FIG. 12 includes the instrumentation (in this example counters) inserted by PGO instrumentation. The instrumented source code 1200 is an example of instrumented source code 510 of FIG. 5.

After running the instrumented program with a representative workload, counters representing the execution frequency for the newly added and original basic blocks are collected. In a second phase, the transformation algorithm is similar to the processing described in reference to FIG. 8. The processing described in reference to blocks 802, 804, and 806 of FIG. 8 are the same, however block 808 is slightly different in the second phase. In accordance with one or more embodiments of the present invention, when performing the control flow changes and creating the new basic blocks, an entry is added to an associated block map of the new basic block to its associated block. For example, given the entry {block 704 "if.then.func1"→block 702 "entry"} in the clone position map, on top of creating a new basic block called new block before the terminator of block 702 "entry," the entry {new block→block 704 "if.then.func1"} is also added to the associated block map.

At this point, the control flow graph is the same as the one from the first phase. The compiler can then read the profile data collected for the new basic blocks and store the information to their associated original basic block with new metadata. For example, from the profile data collected for new block, metadata is created for the terminating instruction of the basic blocks block 704 "if.then.func1" and block 702 "entry", where the metadata of block 704 "if.then.func1" references the metadata of block 702 "entry" and the counter collected for new block. This metadata can indicate how many times the terminator condition of block 704 "if.then.func1" evaluates to true independent of terminator conditions including and after block 702 "entry".

The second phase completes by undoing the control flow changes that were added in the modified block 808 (modified for the second phase) of FIG. 8 by referencing the associated block map. This results in no changes other than the new metadata from the transformed code in the second phase. The new metadata can be used to make better heuristic guided optimization decisions by for example, making a better estimate of the program's control flow. The compiler uses the metadata to produce an executable file. Examples of heuristic guided optimization decisions include, but are not limited to, block ordering including changing the order of nested condition code instructions, function inlining (e.g., to reduce function call overhead), and outlining.

Figure 13:
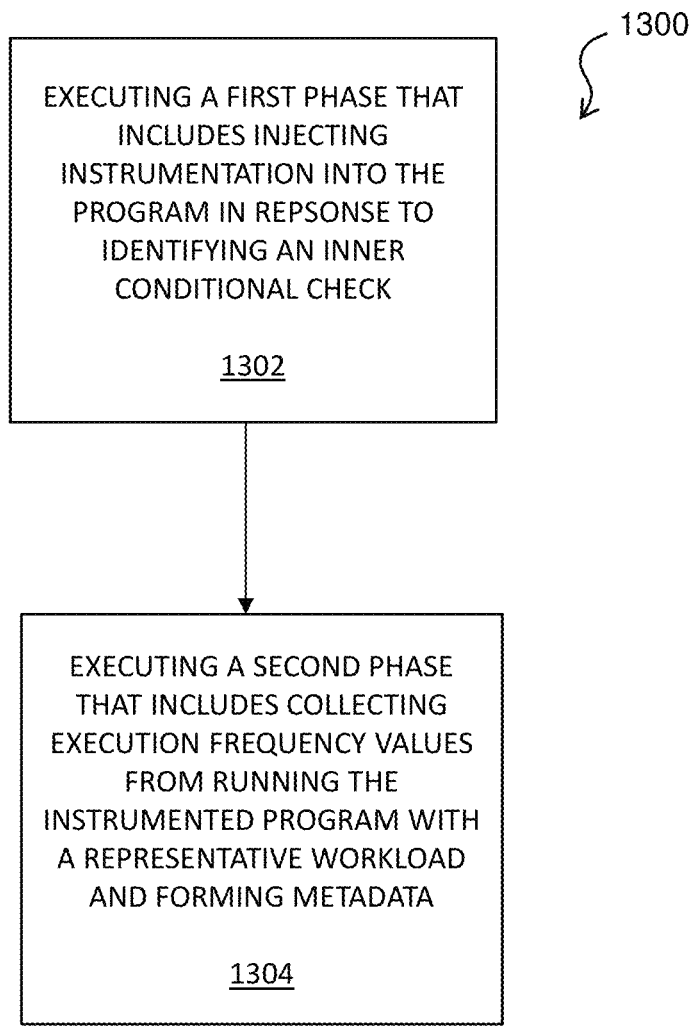
FIG. 13 depicts a process flow of a method for PGO instrumentation for nested conditional checks in accordance with one or more embodiments of the present invention.

Turning now to FIG. 13, a process flow of a method 1300 for PGO instrumentation for nested conditional checks is generally shown in accordance with one or more embodiments of the present invention. The method 1300 shown in FIG. 13 can be performed, for example, by compiler 502 of FIG. 5.

A first phase, instrumentation, is executed at block 1302. The first phase includes injecting instrumentation into the program in response to identifying one or more inner conditional checks. The injecting can include duplicating the inner condition checks, and placing duplicates of the inner conditional checks before a respective original nested conditional check in the program code as described herein to create an instrumented program. The instrumented program includes a plurality of basic blocks including original basic blocks and newly added basic blocks that include the duplicate of the inner conditional check. Finally, the instrumented program is executed with a representative workload.

A second phase, optimization, is executed at block 1304. The second phase includes collecting execution frequency value from first phase of counters associated with the basic blocks to form metadata used by the complier to make heuristic guided optimization decisions. As used herein, the term a "metadata" refers to the extra profiled basic block frequency information of the associated basic block at an earlier point in the program.

The process flow diagrams of FIG. 8 and FIG. 13 are not intended to indicate that the operations of the methods 800 1300 are to be executed in any particular order, or that all of the operations of each of the methods 800 1300 are to be included in every case. Additionally, each of the methods 800 1300 can include any suitable number of additional operations.

Figure 14:
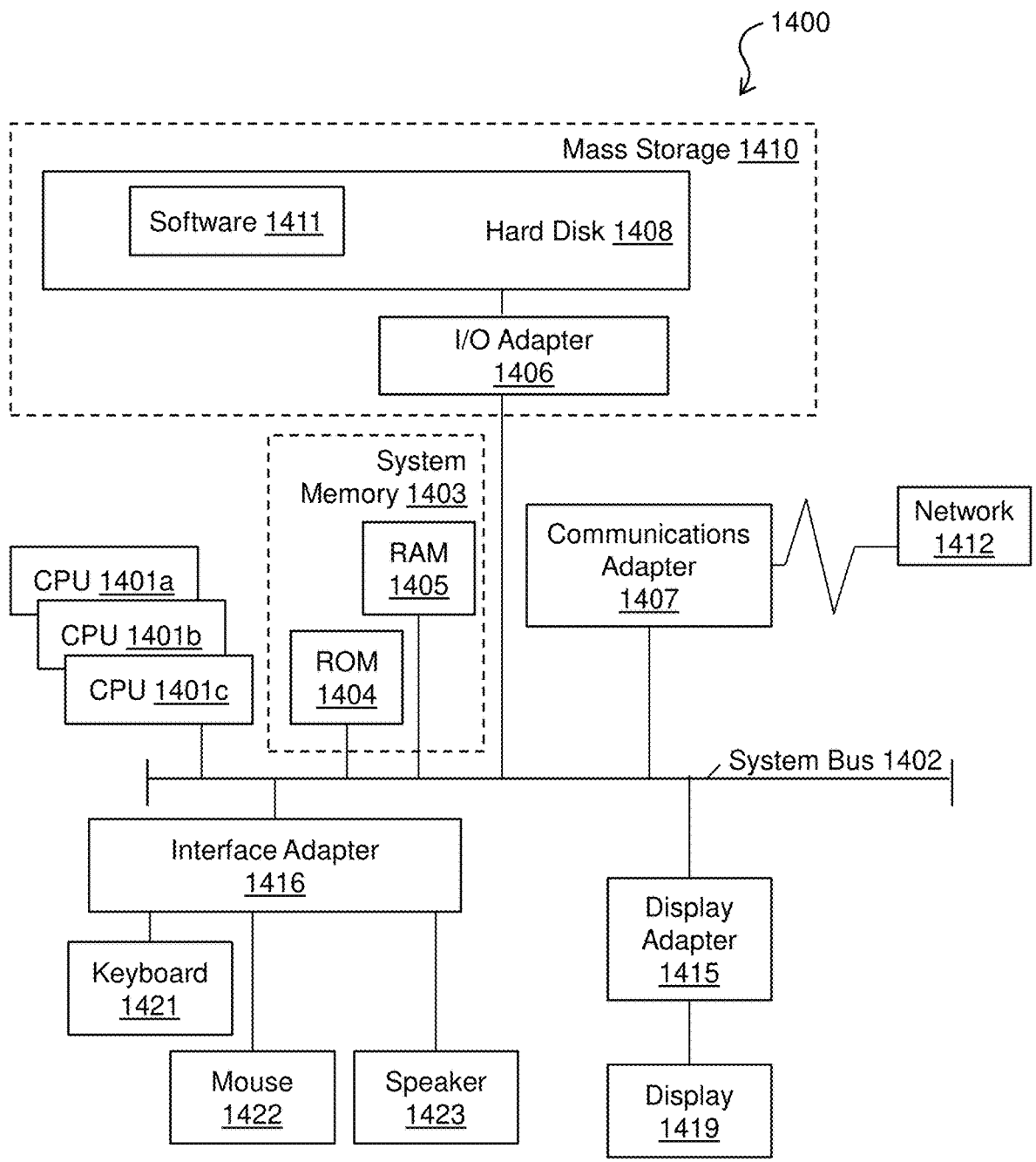
FIG. 14 depicts is a block diagram of an example computer system for use in conjunction with one or more embodiments of the present invention.

Turning now to FIG. 14, a computer system 1400 is generally shown in accordance with an embodiment. The computer system 1400 can be an electronic, computer framework comprising and/or employing any number and combination of computing devices and networks utilizing various communication technologies, as described herein. The computer system 1400 can be easily scalable, extensible, and modular, with the ability to change to different services or reconfigure some features independently of others. The computer system 1400 may be, for example, a server, desktop computer, laptop computer, tablet computer, or smartphone. In some examples, computer system 1400 may be a cloud computing node. Computer system 1400 may be described in the general context of computer system executable instructions, such as program modules, being executed by a computer system. Generally, program modules may include routines, programs, objects, components, logic, data structures, and so on that perform particular tasks or implement particular abstract data types. Computer system 1400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, the computer system 1400 has one or more central processing units (CPU(s)) 1401a, 1401b, 1401c, etc. (collectively or generically referred to as processor(s) 1401). The processors 1401 can be a single-core processor, multi-core processor, computing cluster, or any number of other configurations. The processors 1401, also referred to as processing circuits, are coupled via a system bus 1402 to a system memory 1403 and various other components. The system memory 1403 can include a read only memory (ROM) 1404 and a random access memory (RAM) 1405. The ROM 1404 is coupled to the system bus 1402 and may include a basic input/output system (BIOS), which controls certain basic functions of the computer system 1400. The RAM is read-write memory coupled to the system bus 1402 for use by the processors 1401. The system memory 1403 provides temporary memory space for operations of said instructions during operation. The system memory 1403 can include random access memory (RAM), read only memory, flash memory, or any other suitable memory systems.

The computer system 1400 comprises an input/output (I/O) adapter 1406 and a communications adapter 1407 coupled to the system bus 1402. The I/O adapter 1406 may be a small computer system interface (SCSI) adapter that communicates with a hard disk 1408 and/or any other similar component. The I/O adapter 1406 and the hard disk 1408 are collectively referred to herein as a mass storage 1410.

Software 1411 for execution on the computer system 1400 may be stored in the mass storage 1410. The mass storage 1410 is an example of a tangible storage medium readable by the processors 1401, where the software 1411 is stored as instructions for execution by the processors 1401 to cause the computer system 1400 to operate, such as is described herein below with respect to the various Figures. Examples of computer program product and the execution of such instruction is discussed herein in more detail. The communications adapter 1407 interconnects the system bus 1402 with a network 1412, which may be an outside network, enabling the computer system 1400 to communicate with other such systems. In one embodiment, a portion of the system memory 1403 and the mass storage 1410 collectively store an operating system, which may be any appropriate operating system, such as the z/OS® or AIX® operating system from International Business Machines Corporation to coordinate the functions of the various components shown in FIG. 14.

Additional input/output devices are shown as connected to the system bus 1402 via a display adapter 1415 and an interface adapter 1416 and. In one embodiment, the adapters 1406, 1407, 1415, and 1416 may be connected to one or more I/O buses that are connected to the system bus 1402 via an intermediate bus bridge (not shown). A display 1419 (e.g., a screen or a display monitor) is connected to the system bus 1402 by a display adapter 1415, which may include a graphics controller to improve the performance of graphics intensive applications and a video controller. A keyboard 1421, a mouse 1422, a speaker 1423, etc. can be interconnected to the system bus 1402 via the interface adapter 1416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 14, the computer system 1400 includes processing capability in the form of the processors 1401, and storage capability including the system memory 1403 and the mass storage 1410, input means such as the keyboard 1421 and the mouse 1422, and output capability including the speaker 1423 and the display 1419.

In some embodiments, the communications adapter 1407 can transmit data using any suitable interface or protocol, such as the internet small computer system interface, among others. The network 1412 may be a cellular network, a radio network, a wide area network (WAN), a local area network (LAN), or the Internet, among others. An external computing device may connect to the computer system 1400 through the network 1412. In some examples, an external computing device may be an external webserver or a cloud computing node.

It is to be understood that the block diagram of FIG. 14 is not intended to indicate that the computer system 1400 is to include all of the components shown in FIG. 14. Rather, the computer system 1400 can include any appropriate fewer or additional components not illustrated in FIG. 14 (e.g., additional memory components, embedded controllers, modules, additional network interfaces, etc.). Further, the embodiments described herein with respect to computer system 1400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented process comprising:
  executing a first phase that comprises:
    injecting instrumentation into program code in response to identifying an inner conditional check in the program code, the injecting comprising:
      duplicating the inner conditional check; and
      placing a duplicate of the inner conditional check before a respective original nested conditional check in the program code to create an instrumented program, the instrumented program comprising a plurality of basic blocks including original basic blocks and a newly added basic block that includes the duplicate of the inner conditional check; and
    running the instrumented program with a representative workload; and
  executing a second phase that comprises:
    collecting execution frequency values from counters associated with the basic blocks to form metadata used to make optimization decisions for the program code.

2. The method of claim 1, wherein the injecting further comprises adding a counter that is associated with the newly added basic block to count a number of times that the newly added basic block is executed.

3. The method of claim 1, wherein the inner conditional check is identified based at least in part on contents of a dominator tree describing the program code.

4. The method of claim 3, wherein the inner conditional check is selected from a set of candidate conditional branches, each of the candidate conditional branches in the set corresponding to a node in the dominator tree that has more than one child and that does not have potential side effects.

5. The method of claim 4, further comprising removing nodes from the set that do not have an ancestor node in the set.

6. The method of claim 4, wherein the inner conditional check has a different control flow than any of the other nodes in the set.

7. The method of claim 1, wherein the injecting comprises determining a position in the program code for the duplicate of the duplicate inner conditional check based at least in part on one or both of traversing a dominator tree describing the program code and traversing a post dominator tree describing the program code, wherein the placing is at the determined position.

8. The method of claim 1, wherein the executing the first phase and second phase is performed by a compiler.

9. The method of claim 1, further comprising optimizing the program code based at least in part on the new metadata.

10. The method of claim 9, wherein the optimizing comprises switching an order of the conditional checks in the program code.

11. The method of claim 1, wherein a plurality of duplicate inner conditional checks, including the duplicate inner conditional check are placed in the program code.

12. A system comprising:
  a memory having computer readable instructions; and
  one or more processors for executing the computer readable instructions, the computer readable instructions controlling the one or more processors to perform operations comprising:
    executing a first phase that comprises:
    injecting instrumentation into program code in response to identifying an inner conditional check in the program code, the injecting comprising:
      duplicating the inner conditional check; and
      placing a duplicate of the inner conditional check before a respective original nested conditional check in the program code to create an instrumented program, the instrumented program comprising a plurality of basic blocks including original basic blocks and a newly added basic block that includes the duplicate of the inner conditional check; and
    running the instrumented program with a representative workload; and
    executing a second phase that comprises:
    collecting execution frequency values from counters associated with the basic blocks to form metadata used to make optimization decisions for the program code.

13. The system of claim 12, wherein the injecting further comprises adding a counter that is associated with the newly added basic block to count a number of times that the newly added basic block is executed.

14. The system of claim 12, wherein the inner conditional check is identified based at least in part on contents of a dominator tree describing the program code.

15. The system of claim 12, wherein the injecting comprises determining a position in the program code for the duplicate of the duplicate inner conditional check based at least in part on one or both of traversing a dominator tree describing the program code and traversing a post dominator tree describing the program code, wherein the placing is at the determined position.

16. The system of claim 12, wherein the executing the first phase and second phase is performed by a compiler.

17. The system of claim 12, wherein the operations further comprise optimizing the program code based at least in part on the new metadata.

18. The system of claim 12, wherein a plurality of duplicate inner conditional checks, including the duplicate inner conditional check are placed in the program code.

19. A computer program product comprising a computer readable storage medium having program instructions embodied therewith, the program instructions executable by one or more processors to cause the one or more processors to perform operations comprising:

executing a first phase that comprises:
    injecting instrumentation into program code in response to identifying an inner conditional check in the program code, the injecting comprising:
    duplicating the inner conditional check; and
    placing a duplicate of the inner conditional check before a respective original nested conditional check in the program code to create an instrumented program, the instrumented program comprising a plurality of basic blocks including original basic blocks and a newly added basic block that includes the duplicate of the inner conditional check; and
    running the instrumented program with a representative workload; and
executing a second phase that comprises:
    collecting execution frequency values from counters associated with the basic blocks to form metadata used to make optimization decisions for the program code.

20. The computer program product of claim 19, wherein a plurality of duplicate inner conditional checks, including the duplicate inner conditional check are placed in the program code.

* * * * *